United States Patent
Cox

(10) Patent No.: US 9,674,464 B2
(45) Date of Patent: Jun. 6, 2017

(54) NEWS PRODUCTION SYSTEM WITH DVE TEMPLATE FEATURE

(71) Applicant: Tribune Broadcasting Company, LLC, Chicago, IL (US)

(72) Inventor: Gary Wilson Cox, Sacramento, CA (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 0 days.

(21) Appl. No.: 14/809,668

(22) Filed: Jul. 27, 2015

(65) Prior Publication Data
US 2017/0034452 A1    Feb. 2, 2017

(51) Int. Cl.
*H04N 5/272* (2006.01)
*H04N 21/81* (2011.01)

(52) U.S. Cl.
CPC ......... *H04N 5/272* (2013.01); *H04N 21/8153* (2013.01)

(58) Field of Classification Search
None
See application file for complete search history.

(56) References Cited

U.S. PATENT DOCUMENTS

| | | | |
|---|---|---|---|
| 2007/0011710 A1 | 1/2007 | Chiu | |
| 2009/0089352 A1* | 4/2009 | Davis | G06Q 10/00 709/201 |
| 2009/0319574 A1 | 12/2009 | Burgard et al. | |
| 2013/0174026 A1* | 7/2013 | Locke | G06Q 10/10 715/254 |
| 2015/0081765 A1* | 3/2015 | Mountain | H04L 67/02 709/203 |

FOREIGN PATENT DOCUMENTS

| | | |
|---|---|---|
| WO | 0039997 A2 | 7/2000 |
| WO | 0215188 A1 | 2/2002 |
| WO | 2013009695 A1 | 1/2013 |

OTHER PUBLICATIONS

The International Search Report (ISR) with Written Opinion of the International Searching Authority for PCT/US2016/043558 mailed Nov. 1, 2016.

* cited by examiner

*Primary Examiner* — Eileen Adams
(74) *Attorney, Agent, or Firm* — McDonnell Boehnen Hulbert & Berghoff LLP

(57) ABSTRACT

In one aspect, an example method involves: accessing, by a computing system, data associated with an election; using, by the computing system, the accessed data to make a determination that a status of the election satisfies each condition in a condition set; based, at least in part, on the determination, selecting, by the computing system, a particular digital video-effect (DVE) template configured to facilitate generation of a DVE having a particular attribute; and executing, by the computing system, the selected DVE template, thereby causing the computing system to generate a video stream representing video content.

20 Claims, 7 Drawing Sheets

*500

| Story Title | Video-Segment Identifier | Duration | DVE Identifier |
|---|---|---|---|
| STORY A | VS ID A | 00:02:00:00 | DVE ID A |
| STORY B | VS ID B | 00:01:30:00 | |
| STORY C | | 00:00:30:00 | DVE ID C |
| STORY D | VS ID D | 00:00:30:00 | |
| STORY E | VS ID E | 00:00:30:00 | |
| COMMERCIAL BREAK | | | |
| STORY F | VS ID F | 00:02:00:00 | DVE ID F |
| STORY G | | 00:01:30:00 | DVE ID G |
| STORY H | VS ID H | 00:00:30:00 | |
| STORY I | VS ID I | 00:00:30:00 | |

Figure 5

NEWS PRODUCTION SYSTEM WITH DVE TEMPLATE FEATURE

USAGE AND TERMINOLOGY

In this disclosure, with respect to all reasonable derivatives of such terms, unless otherwise specified and/or unless the particular context clearly dictates otherwise, each usage of "a" or "an" means at least one, and each usage of "the" means the at least one.

BACKGROUND

Unless otherwise specified, the materials described in this section are not prior art to the claims in this disclosure and are not admitted to be prior art by inclusion in this section.

A news production system (NPS) may generate and output a video stream representing a news program. The NPS may include various components to aid in the process of generating and outputting the video stream. For example, the NPS may include a scheduling system, which may provide a user interface that allows a user (e.g., a producer or technical director) to create and/or edit a program schedule of the news program. The scheduling system may then process records in the program schedule, and based on the processed records, control one or more devices, systems, or other entities of the NPS to facilitate generating and outputting the video stream.

The NPS may also include a digital video-effect (DVE) system, which may generate and execute a DVE, which causes the DVE system to generate a video stream representing video content. In one example, the DVE system may receive a video stream representing a video segment, and may execute a DVE, which causes the DVE system to modify the video segment (e.g., by overlaying text, images, video, or other content thereon) and to generate a new video stream representing the modified video segment.

SUMMARY

In a first aspect, an example method includes: accessing, by a computing system, data associated with an election; using, by the computing system, the accessed data to make a determination that a status of the election satisfies each condition in a condition set; based, at least in part, on the determination, selecting, by the computing system, a particular DVE template configured to facilitate generation of a DVE having a particular attribute; and executing, by the computing system, the selected DVE template, thereby causing the computing system to generate a video stream representing video content.

In a second aspect, an example non-transitory computer-readable medium has stored thereon, program instructions that when executed by a processor, cause a computing system to perform a set of acts including: accessing data associated with an election; using the accessed data to make a determination that a status of the election satisfies each condition in a condition set; based, at least in part, on the determination, selecting a particular DVE template configured to facilitate generation of a DVE having a particular attribute; and executing the selected DVE template, thereby causing generation of a video stream representing video content.

In a third aspect, an example method includes: accessing, by a computing system, data associated with an election; using, by the computing system, the accessed data to make a determination that a status of the election satisfies each condition in a condition set; based, at least in part, on the determination, determining, by the computing system, a particular DVE attribute; generating, by the computing system a DVE template configured to facilitate generation of a DVE having the determined DVE attribute; and executing, by the computing system, the selected DVE template, thereby causing the computing system to generate a video stream representing video content.

In a fourth aspect, an example non-transitory computer-readable medium has stored thereon, program instructions that when executed by a processor, cause a computing system to perform a set of acts including: accessing, by a computing system, data associated with an election; using, by the computing system, the accessed data to make a determination that a status of the election satisfies each condition in a condition set; based, at least in part, on the determination, determining, by the computing system, a particular DVE attribute; generating, by the computing system a DVE template configured to facilitate generation of a DVE having the determined DVE attribute; and executing, by the computing system, the selected DVE template, thereby causing generation of a video stream representing video content.

BRIEF DESCRIPTION OF THE DRAWINGS

FIG. 5 is a simplified illustration of an example program schedule.

DETAILED DESCRIPTION

I. Overview

Figure 1:
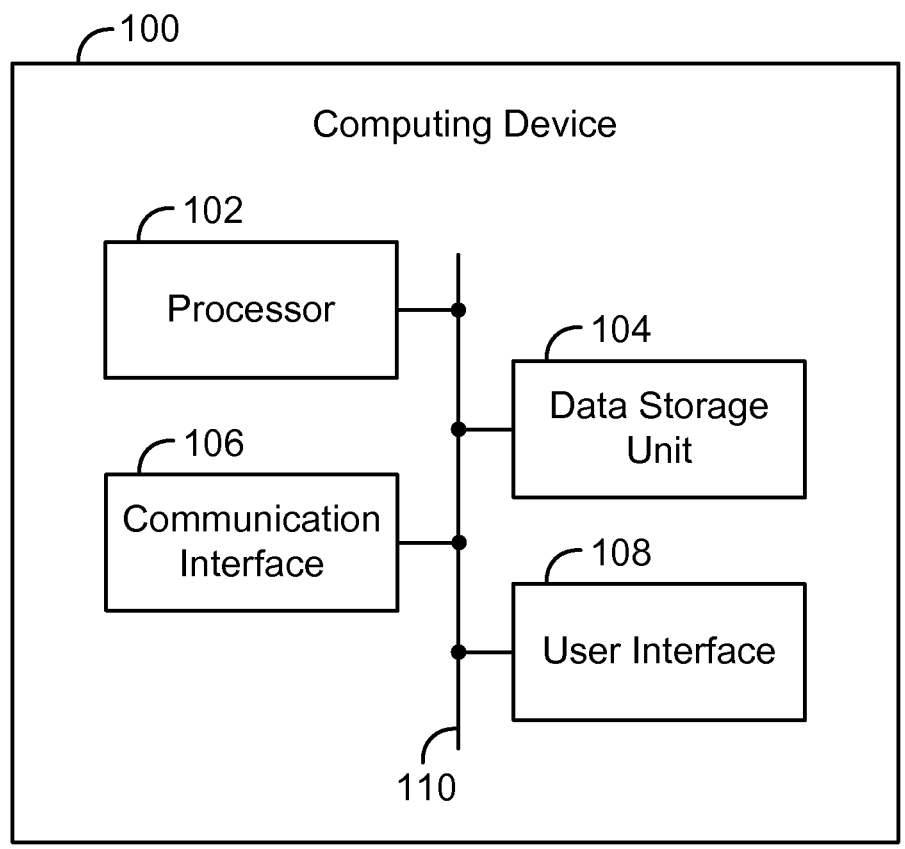
FIG. 1 is a simplified block diagram of an example computing device.

As noted above, a DVE system of an NPS may generate and execute a DVE to generate a video stream representing video content. For instance, in a scenario where an NPS produces a news program that provides coverage of an election, a DVE system may execute a DVE that causes the DVE system to generate a video stream representing video content that includes content relating to the election (e.g., a total number of tabulated votes for each candidate of the election).

A DVE system may generate a DVE based, at least in part, on input received via a user interface. This may allow a user to configure a DVE in various ways (e.g., by specifying a background color or by specifying a size and position of an image to be presented). However, configuring a DVE in this way may be time consuming, which may be undesirable.

The present disclosure provides an NPS that helps address this issue. In one aspect, the NPS includes an election system and a DVE system. The election system may collect and organize various types of election-related data, such as data representing the status of a particular election. The election system may access and use this data to make a determination that the status of the election satisfies each condition in a condition set, and based, at least in part on the determination, the election system may select a particular DVE template configured to facilitate generation of a DVE having a particular attribute. This allows the election system to select a DVE template that is well-suited for the content sought to be presented as a result of the DVE system executing the generated DVE.

As one example, the condition set may include a condition that a leading candidate of the election is affiliated with a particular political party. Further, the nature of the particular attribute may be one where the DVE system executing a DVE having the attribute causes the DVE system to generate of a video stream representing video content that includes content of a particular color. As such, in the case where a candidate affiliated with the Democratic Party is leading the election, the video content may include election data overlaid on a blue background. Alternatively, in the case where a candidate affiliated with the Republican Party is leading the election, the video content may include election data overlaid on a red background.

After the election system selects a DVE template, the election system may display the selected DVE template, such that a user may use the DVE template to generate a DVE. As such, the election system may use the selected DVE template and input received via a user interface to generate a DVE. In another example, the DVE system may use the selected DVE template to generate a DVE.

Also, as an alternative to the election system selecting a DVE template, the election system may determine a particular DVE attribute, and may generate a DVE having the determined DVE attribute. As such, in the event that a particular type of DVE template is not available to be selected, the election system may instead generate a DVE template. In this case, the DVE system may use the generated DVE template to generate a DVE.

II. Example Devices and Systems

FIG. 1 is a simplified block diagram of an example computing device 100. Computing device 100 may perform various acts and/or functions, such as those described in this disclosure (including the accompanying drawings). Computing device 100 may include various components, such as processor 102, data storage unit 104, communication interface 106, and/or user interface 108. These components may be connected to each other (or to another device, system, or other entity) via connection mechanism 110.

As used in this disclosure, the term connection mechanism means a mechanism that facilitates communication between two or more devices, systems, or other entities. A communication mechanism may be a relatively simple mechanism, such as a cable or system bus, or a relatively complex mechanism, such as a packet-based communication network (e.g., the Internet). In some instances, a connection mechanism may include a non-tangible medium (e.g., where the connection is wireless).

Processor 102 may include a general-purpose processor (e.g., a microprocessor) and/or a special-purpose processor (e.g., a digital signal processor (DSP)).

Data storage unit 104 may include one or more volatile, non-volatile, removable, and/or non-removable storage components, such as magnetic, optical, or flash storage, and/or may be integrated in whole or in part with processor 102. Further, data storage unit 104 may take the form of a non-transitory computer-readable storage medium, having stored thereon program instructions (e.g., compiled or non-compiled program logic and/or machine code) that, when executed by processor 102, cause computing device 100 to perform one or more acts and/or functions, such as those described in this disclosure. As such, computing device 100 may be configured to perform one or more acts and/or functions, such as those described in this disclosure. Such program instructions may define and/or be part of a discrete software application that can be executed in response to certain inputs being received from communication interface 106 and/or user interface 108, for instance. Data storage unit 104 may also store other types of data, such as those types described in this disclosure.

Communication interface 106 may allow computing device 100 to connect to and/or communicate with a device, system, or other entity according to one or more protocols. In one example, communication interface 106 may be a wired interface, such as an Ethernet interface or a high-definition serial-digital-interface (HD-SDI). In another example, communication interface 106 may be a wireless interface, such as a cellular or WI-FI interface. Each connection described in this disclosure may be a direct connection or an indirect connection, the latter being a connection that passes through and/or traverses one or more devices, systems, or other entities, such as such as a router, switcher, or other network device.

User interface 108 may facilitate interaction with a user of computing device 100, if applicable. As such, user interface 108 may include input components such as a keyboard, a keypad, a mouse, a touch-sensitive panel, a microphone, and/or a camera, and/or output components such as a display device (which, for example, may be combined with a touch-sensitive panel), a sound speaker, and/or a haptic feedback system.

Computing device 100 may take various forms, such as a workstation, a desktop computer, a laptop, a tablet, and/or a mobile phone.

Figure 2:
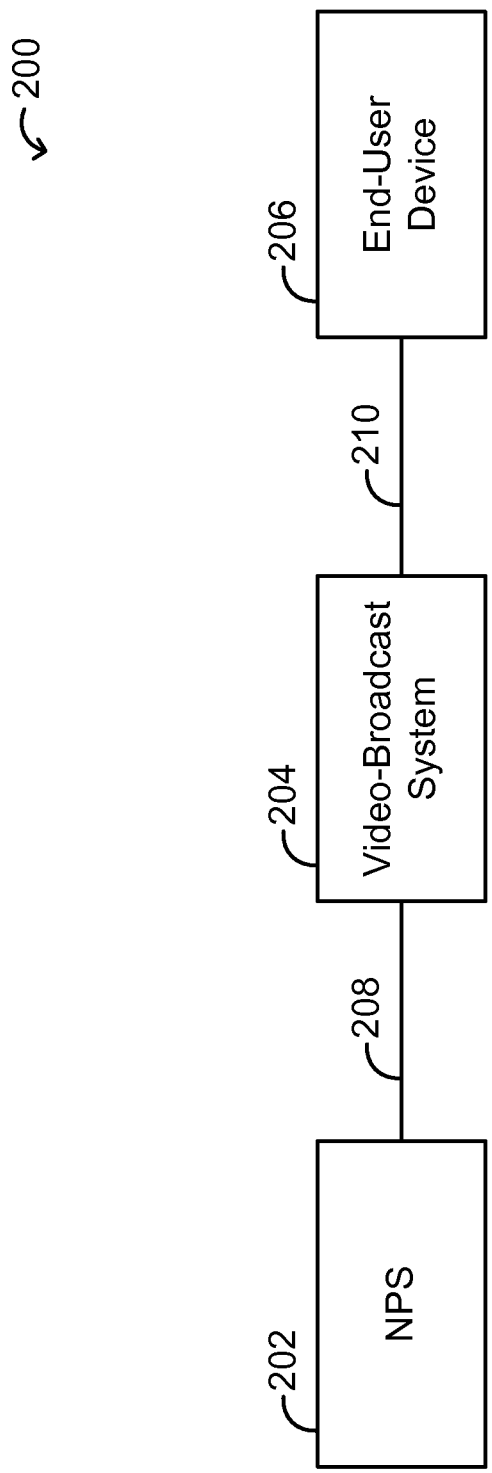
FIG. 2 is a simplified block diagram of an example computing system.

FIG. 2 is a simplified block diagram of an example computing system 200. System 200 may include various components, such as news production system (NPS) 202, video-broadcast system 204, and end-user device 206, each of which may be implemented as a computing device or a computing system that includes one or more computing devices. System 200 may also include connection mechanism 208, which connects NPS 202 with video-broadcast system 204; and connection mechanism 210, which connects video-broadcast system 204 with end-user device 206.

NPS 202 may generate a video stream representing a news program, and may then transmit the video stream to video-broadcast system 204. Video-broadcast system 204 may then receive the video stream and transmit the video stream to end-user device 206 for presentation of the represented video content to an end-user. In practice, video-broadcast system 204 may transmit the video stream to a large number of end-user devices for presentation of the represented video content to a large number of end-users.

A video stream may be transmitted according to a variety of different standards. For instance, a video stream may be transmitted according to the high-definition serial digital interface (HD-SDI) with a data transfer rate of 1.485 Gbps. In some instances, a video stream may be encoded and the encoded version of the video stream may be transmitted instead of the original video stream.

Figure 3:
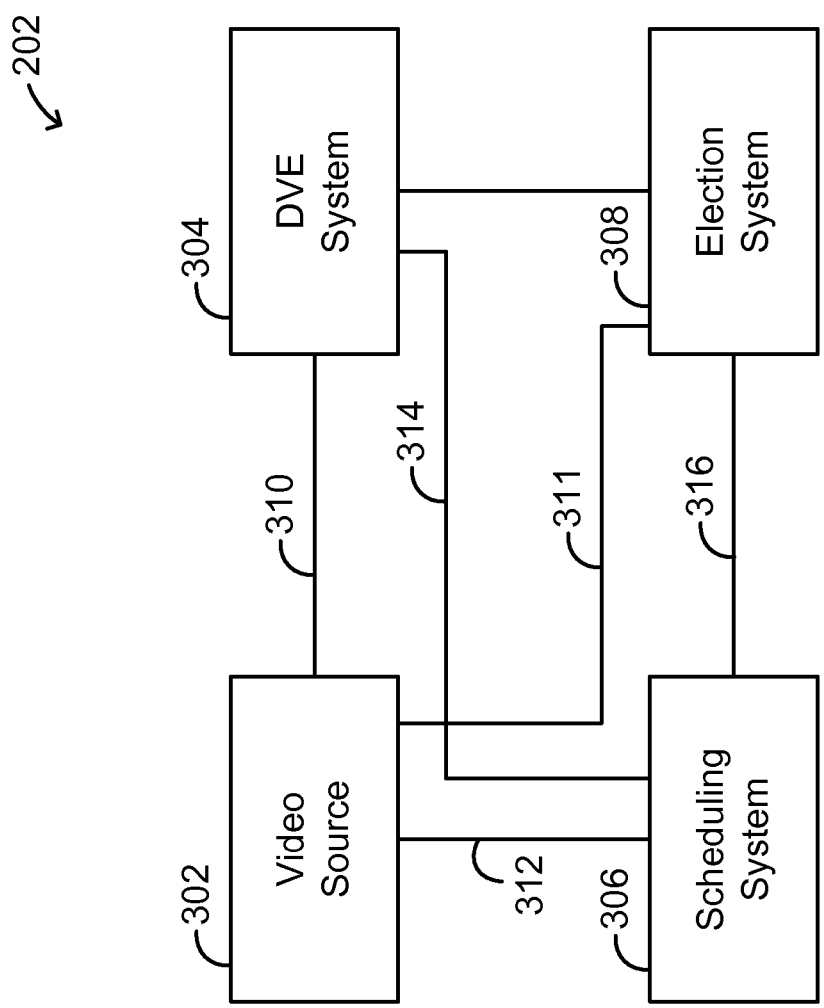
FIG. 3 is a simplified block diagram of an example NPS.

FIG. 3 is a simplified block diagram of an example NPS 202. NPS 202 may include various components, such as video source 302, DVE system 304, scheduling system 306, and election system 308, each of which may be implemented as computing device or a computing system that includes one or more computing devices. NPS 202 may also include connection mechanism 310, which connects video source 302 with DVE system 304; connection mechanism 311, which connects video source 302 to election system 308; connection mechanism 312, which connects scheduling system 306 with video source 302; connection mechanism 314, which connects scheduling system 306 with DVE system 304; and connection mechanism 316, which connects scheduling system 306 with election system 308.

Video source 302 may generate and/or output a video stream, and may transmit the video stream to DVE system 304. Video source 302 may take various forms, such as a video camera, a satellite receiver, or a video server. An example video server is the K2 server provided by Grass Valley™ of San Francisco, Calif.

DVE system 304 may execute a DVE, which may cause DVE system 304 to generate and/or output a video stream. DVE system 304 may then transmit the generated video stream to another device, system, or entity, such as video-broadcast system 204.

In one example, DVE system 304 may receive from video source 302, a video stream representing a video segment, and may execute a DVE, which causes DVE system 304 to modify the video segment and to generate and output a new video stream representing the modified video segment.

DVE system 304 may modify the video segment in various ways, such as by overlaying text, images, video, or other content thereon. For example, DVE system 304 may modify the video segment by overlaying a channel logo in a lower right-hand corner of the video segment. As another example, DVE system 304 may modify the video segment by overlaying a text box including text over a lower-third portion of the video segment. As yet another example, DVE system 304 may modify the video segment by overlaying election-related content on the video segment.

Figure 4A:
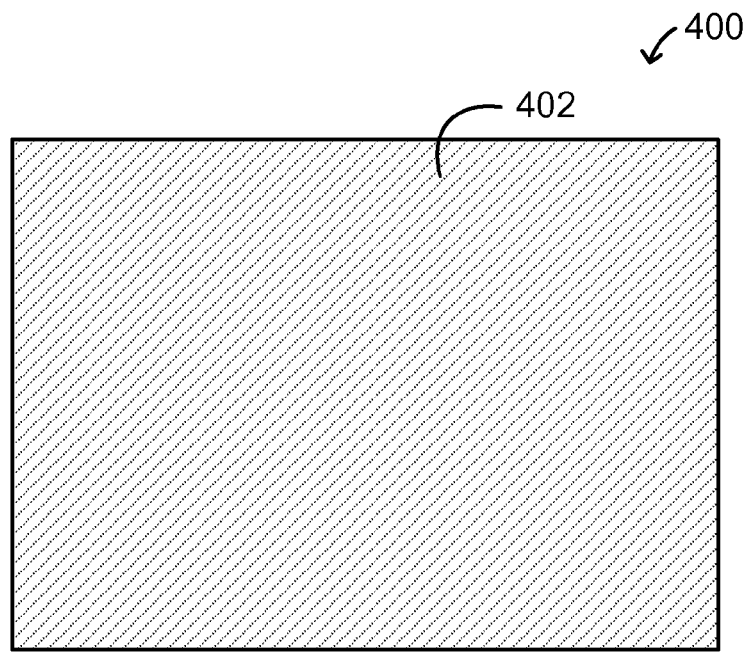
FIG. 4A is a simplified illustration of a frame of an example video segment, where no content is overlaid on the frame.
Figure 4B:
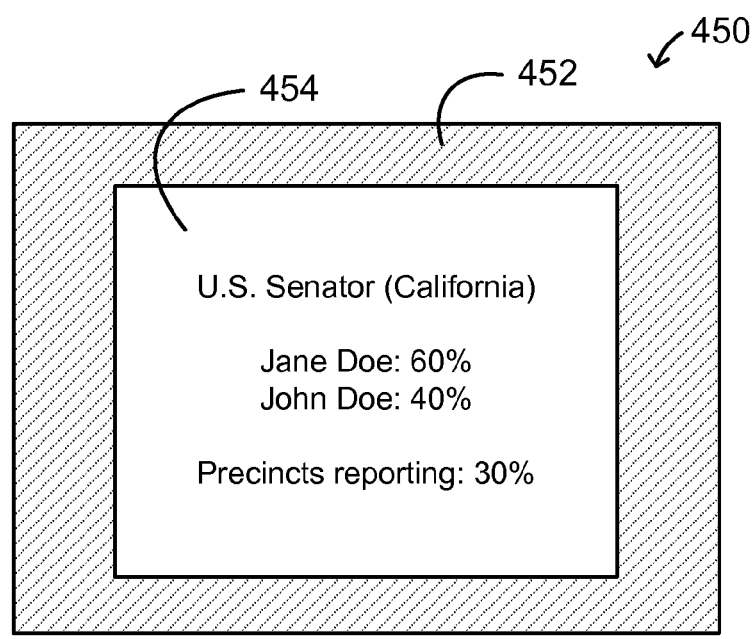
FIG. 4B is a simplified illustration of a frame of an example video segment, where content is overlaid on the frame.

FIGS. 4A and 4B help illustrate the concept of overlaying content on a video segment. FIG. 4A is a simplified diagram of a frame 400 of an example video segment. Frame 400 includes content 402, but does not include content overlaid on content 402. For comparison, FIG. 4B is a simplified diagram of a frame 450 of an example video segment. Frame 452 includes content 452 and content 454 overlaid on content 452. Content 454 is content related to an election, namely one for a U.S. Senator representing California. Content 454 indicates vote total percentages of 60% and 40% for two candidates, Jane Doe and John Doe, respectively, and further indicates that 30% of precincts are reporting.

As noted above, DVE system 304 may execute a DVE, which causes DVE system 304 to generate a video stream by modifying a video segment represented by an existing video stream. However, as another example, DVE system 304 may execute a DVE, which causes DVE system 304 to generate a video stream without using an existing video stream. In this case, rather than overlaying content on an existing video segment, DVE system 304 may instead generate a new video segment, and may generate a video stream representing the generated video segment.

DVE system 304 may obtain content for use in connection with executing a DVE in various ways. For example, DVE system 304 may retrieve such content from a data storage unit in the DVE system. As another example, DVE system 304 may receive such content from another source, such as video source 302 or election system 308.

In practice, DVE system 304 may execute multiple DVEs in serial fashion. Further, in practice, NPS 202 may include multiple video sources and/or multiple DVE systems. For example, in one arrangement, each of multiple video sources may be connected to DVE system 304, and DVE system 304 may switch between one or more inputs as appropriate to execute a given DVE.

DVE system 304 may also perform other acts and/or functions related to DVEs. For example, DVE system 304 may provide a user interface that allows a user to facilitate generating and/or editing DVEs. When DVE system 304 generates a DVE, DVE system 304 may generate and store corresponding program instructions for later retrieval and execution. As such, the process of the DVE system 304 executing a DVE may involve DVE system retrieving and executing program instructions corresponding to the DVE.

In some instances, DVE system 304 may generate a DVE template, which may facilitate the process of generating a DVE. A DVE template may specify one or more default attributes of a DVE, one or more of which can be edited by a user or a computing device. As one example, a DVE template may specify a particular background color or a particular size or position of an image to be presented when the DVE is executed. As such, a user or a computing device may use a DVE template to generate a DVE.

DVE system 304 may take various forms, such as a production switcher. An example production switcher is the Vision Octane production switcher provided by Ross Video Ltd. of Iroquois, Ontario in Canada.

Scheduling system 306 may perform acts and/or functions related to scheduling and managing the production of a news program. For example, scheduling system 306 may provide a user interface that allows a user to create and/or edit a program schedule of a news program. Further, scheduling system 306 may process records in a program schedule. This may result in scheduling system 306 controlling one or more other devices, systems, or entities of the NPS 202 to cause NPS 202 to generate and/or output a video stream representing a news program. As such, based on a program schedule, scheduling system 306 may control video source 302 and DVE system 304.

A program schedule (sometimes referred to in the industry as a "rundown") serves as an outline of a news program and may include multiple records. A news program may be conceptually divided into multiple logically-separated portions (sometimes referred to in the industry as "stories"). As such, each portion of the news program may be represented by a separate record of the program schedule. Each record may include various types of information.

FIG. 5 is a simplified diagram of an example program schedule 500. Program schedule 500 includes 10 records, represented as 10 ordered rows. Each record corresponds to a respective portion of a news program, except for one which corresponds to a commercial break. For each portion, the respective record specifies at least one of a story title, a video-segment identifier, a duration, and a DVE identifier (which may serve as an instruction to execute the identified DVE).

For example, the first record specifies a story title of STORY A, a video-segment identifier of VS ID A, a duration of 00:02:00:00 (in hours::minutes::seconds::frames format), and a DVE identifier of DVE ID A. As such, upon scheduling system 306 processing the first record, scheduling system 306 may cause video source 302 to playout a video segment identified by the identifier video-segment identifier VS ID A for two minutes, and further may cause DVE system 304 to execute a DVE identified by the DVE identifier DVE ID A, which for example, may cause DVE system 304 to overlay content on the video segment.

As another example, the third record specifies a story title of STORY C, a duration of 00:00:30:00, and a DVE identifier of DVE ID C. As such, upon scheduling system 306 processing the third record, scheduling system 306 may cause DVE system 304 to execute a DVE identified by the DVE identifier DVE ID C, which for example, may cause DVE system 304 to generate and output, for two minutes, a video stream representing video content.

It should be noted that program schedule 500 has been greatly simplified for the purposes of illustrating certain features. In practice, a program schedule is likely to include significantly more data such as further details with regarding to DVE execution timing.

Election system 308 may facilitate the process of gathering, organizing, and outputting election-related data. Such data may come from various sources, such as from government-operated reporting systems, and may take various forms. Such data may indicate various types of information about elections, such as titles of political offices that are the subject of the elections, names and other information of candidates, amounts of votes cast and/or tabulated for candidates, amounts and identifies of precincts or other zones reporting tabulated votes, and/or projections of election outcomes.

In this disclosure, the terms "election" means any type of vote-based decision-making process. In one example, an election may involve a process where voters vote to determine which candidate obtains a political office. In another example, an election may involve a ballot-initiative process where voters vote to determine whether or not a proposed law becomes law. As such, an election may have various types of voting options.

Video-broadcast system 204 may distribute a video stream to an end-user device for presentation of video content represented by the video stream to an end-user. In practice, video-broadcast system 204 may distribute a video stream to a mass number of end-user devices for presentation of video content represented by the video stream to a mass number of end-users. Video-broadcast system 204 may include various systems or components, such as a terrestrial antenna or a satellite, and may be configured for distributing the video stream to end-user device 206 in various ways. For example, video-broadcast system 204 may distribute the video stream over-the-air or via a packet-based network such as the Internet.

End-user device 206 may present video content represented by a received video stream to an end-user. End-user device 26 may take a variety of forms, such as a television, a television set-top box, and/or a computing device. As used throughout this disclosure, the term video-broadcast means the distribution of video via any means.

In some examples, in addition to generating and outputting a video stream representing video content, NPS 202 may generate and output an audio stream representing corresponding audio content. Similarly, in some examples, a video-broadcast system may be integrated with an audio-broadcast system, such that a video stream representing video content may be broadcast together with an audio stream representing corresponding audio content. Likewise, in some examples, in addition to presenting video content represented by a video stream, end-user device 206 may present corresponding audio content represented by a received audio stream. In any of these examples, a video stream and an audio stream may be combined into a single media stream.

III. Example Operations

In one aspect, election system 308 and/or DVE system 304 may perform various acts, which will now be described.

First, election system 308 may access data associated with an election, such as by receiving such data from a data storage unit.

Next, election system 308 may use the accessed data to make a determination that a status of the election satisfies each condition in a condition set. If the status of the election satisfies each condition in the condition set, this may indicate that the election has a particular characteristic, and therefore that a DVE having a particular attribute may be well-suited for use in connection with the election.

The condition set may include one or more conditions. In a first example, the condition set may include a condition that a leading candidate (e.g., leading in popular votes tabulated or Electoral College votes tabulated) of the election is affiliated with a particular political party. In one case, this may indicate that a leading candidate of the election is affiliated with the Democratic Party. In another case, this may indicate that a leading candidate of the election is affiliated with the Republican Party.

In a second example, the condition set may include a condition that a first amount of votes tabulated for a first candidate of the election is at least a threshold amount greater than a second amount of votes tabulated for a second candidate of the election. In some instances, if this condition is satisfied, this may indicate that the first candidate has a significant lead over the second candidate.

In a third example, the condition set may include a condition that a difference between an amount of votes tabulated for a first candidate of the election and an amount of votes tabulated for a second candidate of the election is at most a threshold amount. In some instances, if this condition is satisfied, this may indicate that the election is significantly close.

In a fourth example, the condition set may include a condition that at least a threshold amount of votes cast in connection with the election have been tabulated. In some instances, if this condition is satisfied, this may indicate that there are a significant amount of votes that have been tabulated.

In a fifth example, the condition set may include a condition that a first projected outcome of the election and a second projected outcome of the election differ by at least a threshold extent, where the first projected outcome of the election is determined before the second projected outcome of the election is determined. In some instances, if this condition is satisfied, this may indicate that an earlier projection of the outcome of the election was significantly inaccurate.

In a sixth example, the condition set may include a condition that voter-turnout associated with the election is at least a threshold amount. In one example, scheduling system 306 may determine a voter-turnout amount by comparing an amount of voters registered in a given geographic area (e.g., covering one or more precincts associated with the election) with a corresponding amount of votes tabulated. In some instances, if this condition is satisfied, this may indicate that the election has significantly high voter turnout.

In a seventh example, the condition set may include a condition that voter turnout associated with the election is at most a threshold amount. In some instances, if this condition is satisfied, this may indicate that the election has significantly low voter turnout.

In an eighth example, the condition set may include a condition that the election is a subject of a threshold extent of social-media activity. In one example, the threshold extent of social-media activity may be a threshold amount of social-media activity. In one implementation, scheduling system 306 may determine an amount of social media-activity by querying a social media database (e.g., a database of Twitter or Facebook postings) and determining how many postings include a term related to the election, perhaps during a specified time period. In another example, the threshold extent of social-media activity may be a threshold change in social-media activity. In one implementation, scheduling system 306 may determine a change in social-media activity by comparing amounts of social-media activity across multiple time periods. In some instances, scheduling system 306 may compare activity in one election with activity in other elections to determine whether the activity of that election breaks from a trend of the others. In some instances, if this condition is satisfied, this may indicate that public interest in the election is relatively high. The condition set may include any of these or other conditions in any combination.

Next, based, at least in part, on the determination, election system 308 may select a particular DVE template configured to facilitate generation of a DVE having a particular attribute. Election system 308 may select this DVE template from multiple previously generated DVE templates, perhaps stored in DVE system 304. In one example, election system 308 may use a mapping table to map a condition set to a corresponding DVE template.

This selection process may allow election system 308 to select a well-suited DVE template based, at least in part, on the status of the electrical election. As a first example, where the condition set includes a condition that a leading candidate of the election is affiliated with a particular political party, election system 308 may select a particular DVE template configured to facilitate generation of a DVE having a particular attribute, where DVE system 304 executing a DVE having the particular attribute causes DVE system 304 to generate a video stream representing video content including content of a particular color (e.g., blue or red). As such, in the case where a candidate affiliated with the Democratic Party is leading the election, the video content may include election data overlaid on a blue background (e.g., referring to FIG. 4B, the background behind content 454 may be blue). Alternatively, in the case where a candidate affiliated with the Republican Party is leading the election, the video content may include election data overlaid on a red background.

As a second example, where the condition set includes a condition that a first amount of votes tabulated for a first candidate of the election is at least a threshold amount greater than a second amount of votes tabulated for a second candidate of the election, election system 308 may select a particular DVE template configured to facilitate generation of a DVE having a particular attribute, where DVE system 304 executing a DVE having the particular attribute causes DVE system 304 to generate a video stream representing video content including (i) a first image of the first candidate and (ii) a second image of the second candidate, wherein the first image is larger than the second image. Since satisfying this condition may indicate that the first candidate has a significant lead over the second candidate, the larger-sized image of the first candidate may visually reinforce the fact that the first candidate is leading over the second candidate. In some instances, the difference in size between the two images may be proportional to the difference in the amount of votes of the corresponding candidates. For example, where the second candidate holds a small lead over the first candidate, the second image may be slightly larger than the first image, and where the second candidate holds a significant lead over the first candidate, the second image may be significantly larger than the first image.

As a third example, where the condition set includes a condition that a difference between an amount of votes tabulated for a first candidate of the election and an amount of votes tabulated for a second candidate of the election is at most a threshold amount, election system 304 may select a particular DVE template configured to facilitate generation of a DVE having a particular attribute, where DVE system 304 executing a DVE having the particular attribute causes DVE system 304 to generate a video stream representing video content including a particular media content item, such as a flame graphic. Since satisfying this condition may indicate that the election is significantly close, the flame graphic may visually reinforce the fact that the election is a "hot" election (i.e., one that is significantly close).

After election system 308 selects a DVE template, election system 308 may display the selected DVE template, such that a user may use the DVE template to generate a DVE. As such, DVE system 304 may use the selected DVE template and input received via a user interface to generate a DVE. Alternatively, a computing device may use the DVE template to generate a DVE.

Next, DVE system 304 may execute the generated DVE, thereby causing DVE system 304 to generate a video stream representing video content. Then, DVE system 304 may transmit the generated video stream to an end-user device for presentation of the represented video content to an end-user.

As an alternative to election system 308 selecting a DVE template, election system 308 may determine a particular DVE attribute, and may generate a DVE having the determined DVE attribute. As such, in the event that a particular type of DVE template is not available to be selected, election system 308 may instead generate a DVE template. In one example, election system 308 may use a mapping table to map a condition set to a corresponding DVE attribute. Further, in one example, election system 308 may cause DVE system 304 to generate the DVE template, such as by transmitting a suitable instruction to DVE system 304.

Figure 6:
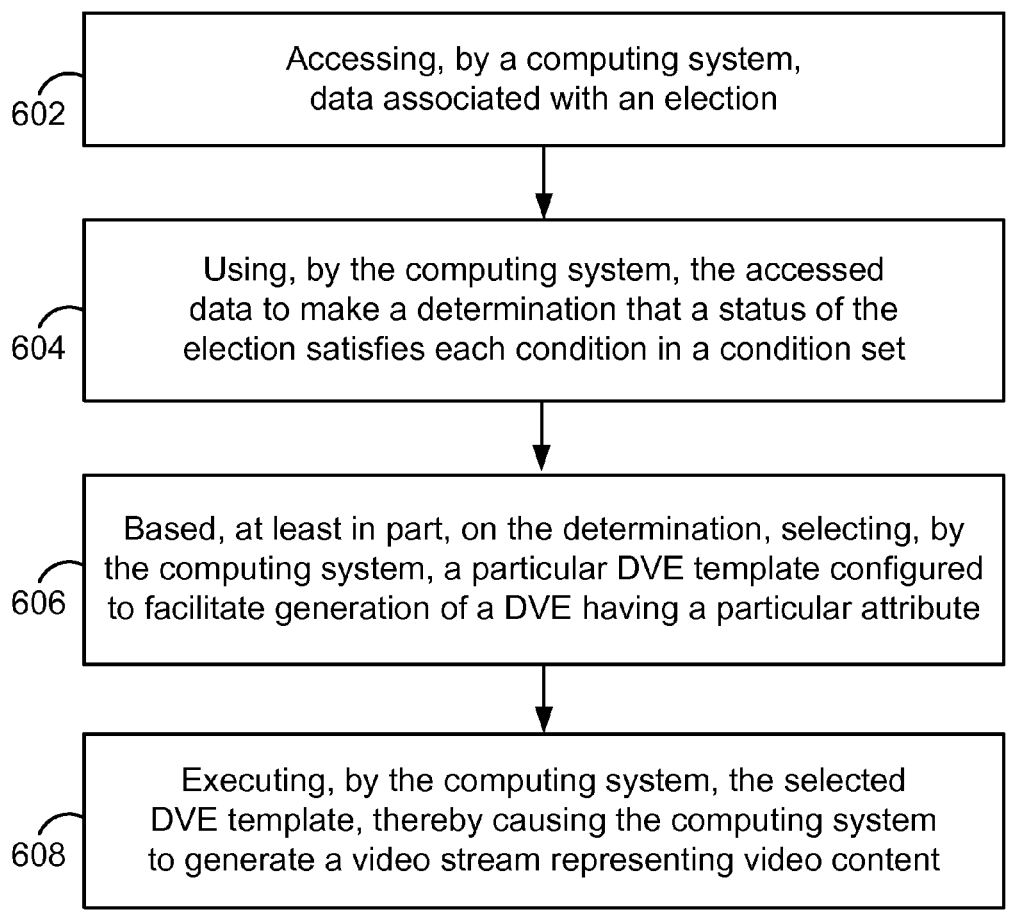
FIG. 6 is a flow chart illustrating an example method.

FIG. 6 is a flow chart illustrating an example method 600. At block 602, method 600 may include accessing, by a computing system, data associated with an election.

At block 604, method 600 may include using, by the computing system, the accessed data to make a determination that a status of the election satisfies each condition in a condition set.

At block 606, method 600 may include based, at least in part, on the determination, selecting, by the computing system, a particular DVE template configured to facilitate generation of a DVE having a particular attribute.

At block 608, method 600 may include executing, by the computing system, the selected DVE template, thereby causing the computing system to generate a video stream representing video content.

Figure 7:
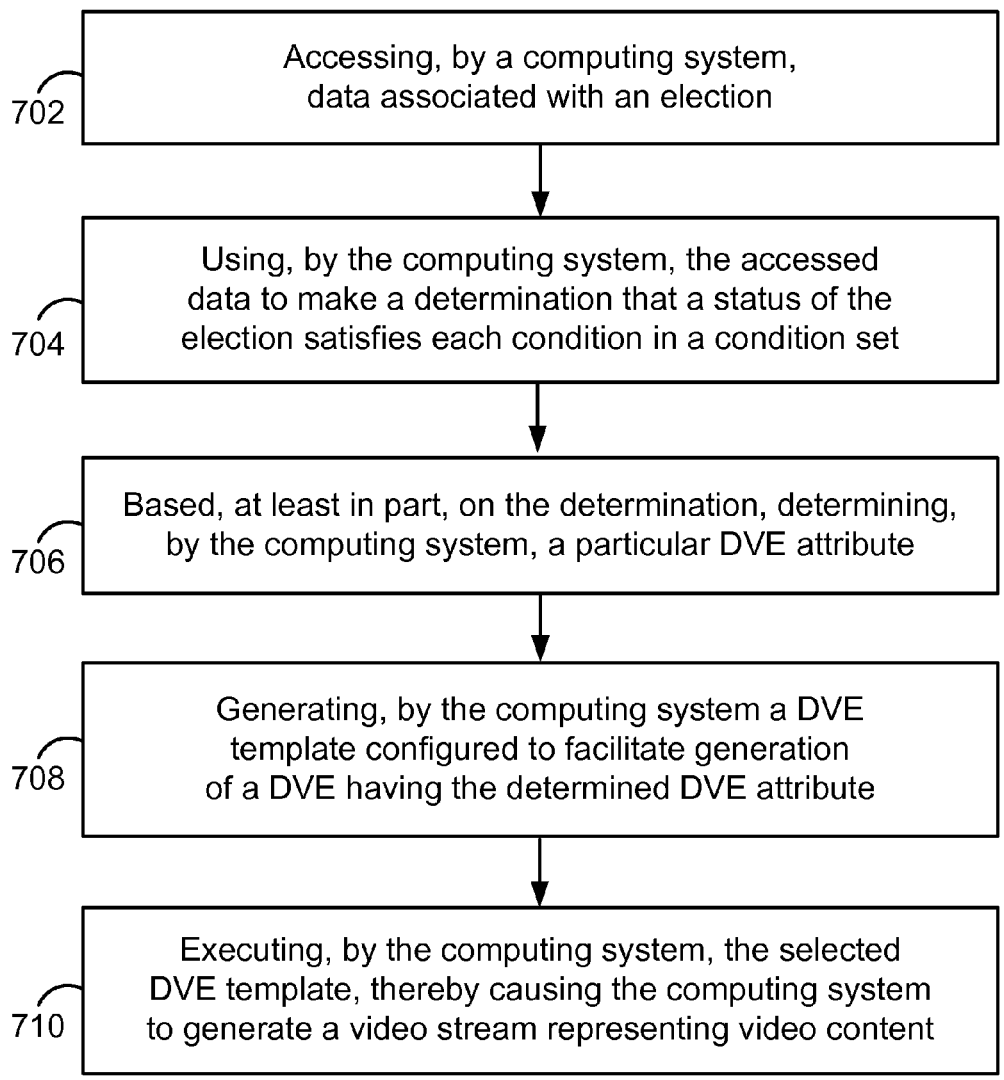
FIG. 7 is a flow chart illustrating another example method.

FIG. 7 is a flow chart illustrating an example method 700. At block 702, method 700 may include accessing, by a computing system, data associated with an election.

At block 704, method 700 may include using, by the computing system, the accessed data to make a determination that a status of the election satisfies each condition in a condition set.

At block 706, method 700 may include based, at least in part, on the determination, determining, by the computing system, a particular DVE attribute.

At block 708, method 700 may include generating, by the computing system a DVE template configured to facilitate generation of a DVE having the determined DVE attribute.

At block 710, method 700 may include executing, by the computing system, the selected DVE template, thereby causing the computing system to generate a video stream representing video content.

IV. Example Variations

Each of the systems, devices, or other entities described in this disclosure may or may not be a discrete entity. As such, each of the described entities may be made up of multiple discrete entities. Further, two or more of the described entities may be combined into a single discrete entity.

Although some of the acts and/or functions described in this disclosure have been described as being performed by a particular entity (e.g., DVE system 304 or election system 308), such acts and/or functions may be performed by any entity, such as those described in this disclosure (e.g., scheduling system 306). Further, although the described acts and/or functions have been recited in a particular order, the acts and/or functions need not be performed in the order recited. However, in some instances, it may be desired to perform the acts and/or functions in the order recited. Also, not all of the described acts and/or functions need to be performed to achieve one or more of the benefits provided by this disclosure, and therefore not all acts and/or functions are required.

Although certain variations have been discussed in connection with one or more example of this disclosure, such variations may also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising:
accessing, by a computing system, data associated with an election;
using, by the computing system, the accessed data to make a determination that a status of the election satisfies each condition in a condition set;
based, at least in part, on the determination that the status of the election satisfies each condition in the condition set, selecting, by the computing system, a particular digital video-effect (DVE) template configured to facilitate generation of a DVE having a particular attribute for modifying video content; and
using, by the computing system, the selected DVE template to execute the DVE having the particular attribute, wherein executing the DVE having the particular attribute causes the computing system to generate a video stream representing video content.

2. The method of claim 1, wherein the condition set comprises a first condition that a leading candidate of the election is affiliated with a particular political party, wherein the particular attribute comprises a first attribute, and wherein execution of the DVE having the first attribute causes generation of a video stream representing video content including content of a particular color.

3. The method of claim 1, wherein the condition set comprises a second condition that a first amount of votes tabulated for a first candidate of the election is at least a threshold amount greater than a second amount of votes tabulated for a second candidate of the election, wherein the particular attribute comprises a second attribute, and wherein execution of the DVE having the second attribute causes generation of a video stream representing video content including (i) a first image of the first candidate and (ii) a second image of the second candidate, wherein the first image is larger than the second image.

4. The method of claim 1, wherein the condition set comprises a third condition that a difference between an amount of votes tabulated for a first candidate of the election and an amount of votes tabulated for a second candidate of the election is at most a threshold amount, wherein the particular attribute comprises a third attribute, and wherein execution of the DVE having the third attribute causes generation of a video stream representing video content including a particular media content item.

5. The method of claim 1, further comprising:
executing, by the computing system, the DVE based, at least in part, on (i) the selected DVE template and (ii) instructions received via a user interface.

6. The method of claim 1, further comprising:
transmitting, by the computing system, the generated video stream to an end-user system for presentation of the represented video content to an end-user.

7. The method of claim 1, wherein the computing system comprises a news production system.

8. A non-transitory computer-readable medium having stored thereon, program instructions that when executed by a processor, cause a computing system to perform a set of acts comprising:
accessing data associated with an election;
using the accessed data to make a determination that a status of the election satisfies each condition in a condition set;
based, at least in part, on the determination that the status of the election satisfies each condition in the condition set, selecting a particular digital video-effect (DVE) template configured to facilitate generation of a DVE having a particular attribute for modifying video content; and
using the selected DVE template to execute the DVE having the particular attribute, wherein executing the DVE having the particular attribute causes generation of a video stream representing video content.

9. The computer-readable medium of claim 8, wherein the condition set comprises a first condition that a leading candidate of the election is affiliated with a particular political party, wherein the particular attribute comprises a first attribute, and wherein execution of the DVE having the first attribute causes generation of a video stream representing video content including content of a particular color.

10. The computer-readable medium of claim 8, wherein the condition set comprises a second condition that a first amount of votes tabulated for a first candidate of the election is at least a threshold amount greater than a second amount of votes tabulated for a second candidate of the election, wherein the particular attribute comprises a second attribute, and wherein execution of the DVE having the second attribute causes generation of a video stream representing video content including (i) a first image of the first candidate and (ii) a second image of the second candidate, wherein the first image is larger than the second image.

11. The computer-readable medium of claim 8, wherein the condition set comprises a third condition that a difference between an amount of votes tabulated for a first candidate of the election and an amount of votes tabulated for a second candidate of the election is at most a threshold amount, wherein the particular attribute comprises a third attribute, and wherein execution of the DVE having the third attribute causes generation of a video stream representing video content including a particular media content item.

12. The computer-readable medium of claim 8, the set of acts further comprising:
   executing the DVE based, at least in part, on (i) the selected DVE template and (ii) instructions received via a user interface.

13. The computer-readable medium of claim 8, the set of acts further comprising:
   transmitting the generated video stream to an end-user system for presentation of the represented video content to an end-user.

14. The computer-readable medium of claim 8, wherein the computing system comprises a news production switcher.

15. A method comprising:
   accessing, by a computing system, data associated with an election;
   using, by the computing system, the accessed data to make a determination that a status of the election satisfies each condition in a condition set;
   based, at least in part, on the determination that the status of the election satisfies each condition in the condition set, determining, by the computing system, a particular digital video-effect (DVE) attribute for modifying video content;
   generating, by the computing system, a DVE template configured to facilitate execution of a DVE having the determined DVE attribute for modifying video content; and
   using, by the computing system, the generated DVE template to execute the DVE having the determined DVE attribute, wherein executing the DVE having the determined DVE attribute causes the computing system to generate a video stream representing video content.

16. The method of claim 15, wherein the condition set comprises a first condition that a leading candidate of the election is affiliated with a particular political party, wherein the particular DVE attribute comprises a first attribute, and wherein execution of the DVE having the first attribute causes generation of a video stream representing video content including content of a particular color.

17. The method of claim 15, wherein the condition set comprises a second condition that a first amount of votes tabulated for a first candidate of the election is at least a threshold amount greater than a second amount of votes tabulated for a second candidate of the election, wherein the particular DVE attribute comprises a second attribute, and wherein execution of the DVE having the second attribute causes generation of a video stream representing video content including (i) a first image of the first candidate and (ii) a second image of the second candidate, wherein the first image is larger than the second image.

18. The method of claim 15, wherein the condition set comprises a third condition that a difference between an amount of votes tabulated for a first candidate of the election and an amount of votes tabulated for a second candidate of the election is at most a threshold amount, wherein the particular DVE attribute comprises a third attribute, and wherein execution of the DVE having the third attribute causes generation of a video stream representing video content including a particular media content item.

19. The method of claim 15, further comprising:
   executing, by the computing system, the DVE based, at least in part, on (i) the generated DVE template and (ii) instructions received via a user interface.

20. The method of claim 15, further comprising:
   transmitting, by the computing system, the generated video stream to an end-user system for presentation of the represented video content to an end-user.

* * * * *